United States Patent [19]
McDonald et al.

[11] Patent Number: 4,591,208
[45] Date of Patent: May 27, 1986

[54] SAFETY SHIELD FOR USE IN A VEHICLE

[75] Inventors: Quentin H. McDonald, Scarsdale, N.Y.; Richard L. Panicci, Hanover; Ralph M. Nowak, Wilbraham, both of Mass.

[73] Assignee: Bobby-Mac Company, Inc., Scarsdale, N.Y.

[21] Appl. No.: 100,958

[22] Filed: Dec. 6, 1979

Related U.S. Application Data

[63] Continuation of Ser. No. 344,050, Mar. 22, 1973, abandoned.

[51] Int. Cl.⁴ .................................................. B60N 1/12
[52] U.S. Cl. .................................... 297/487; 297/216; 297/250; 297/DIG. 2
[58] Field of Search ......... 297/216, 250, 253, DIG. 2, 297/148, 487, 488, 364; 280/748, 751

[56] References Cited

U.S. PATENT DOCUMENTS

| | | | |
|---|---|---|---|
| 2,664,140 | 12/1953 | Kindelberger | 297/250 |
| 3,106,295 | 10/1963 | Berlin | 108/159 |
| 3,241,881 | 3/1966 | Carnahan et al. | 297/468 |
| 3,262,716 | 7/1966 | Graham | 297/488 |
| 3,300,247 | 1/1967 | Marks | 297/468 |
| 3,424,497 | 1/1969 | Brilmyer et al. | 297/250 |
| 3,563,600 | 2/1971 | Converse | 297/488 |
| 3,606,457 | 9/1971 | Reay | 297/216 |
| 3,709,558 | 1/1973 | Jakob | 297/250 |
| 3,713,695 | 1/1973 | Von Wimmersperg | 297/216 |
| 3,722,951 | 3/1973 | Ezquerra | 297/488 |
| 3,767,259 | 10/1973 | Blake et al. | 297/216 |
| 3,819,230 | 6/1974 | Bloom | 297/250 |
| 3,865,433 | 2/1975 | Stafford | 297/488 |

Primary Examiner—Kenneth J. Dorner
Attorney, Agent, or Firm—Kenyon & Kenyon

[57] ABSTRACT

The safety shield is designed to be energy absorbing and is constructed of a non-rigid self-supporting energy-absorbing material and is adapted to engage across the side walls of a children's car seat. The lateral sides of the shield are provided with depending flanges which envelop the upstanding side walls of the car seat as well as with snap-lock protuberances for engaging the side walls at top and bottom. Also, the shield is provided with a face guard which extends from the shield and with padding which envelops the face guard and the inside of the shield. A gripping means is provided on the front of the shield to securely receive and grip a retaining belt, such as an automobile seat belt, to hold the seat and shield in place against lateral movement and pivoting.

9 Claims, 6 Drawing Figures

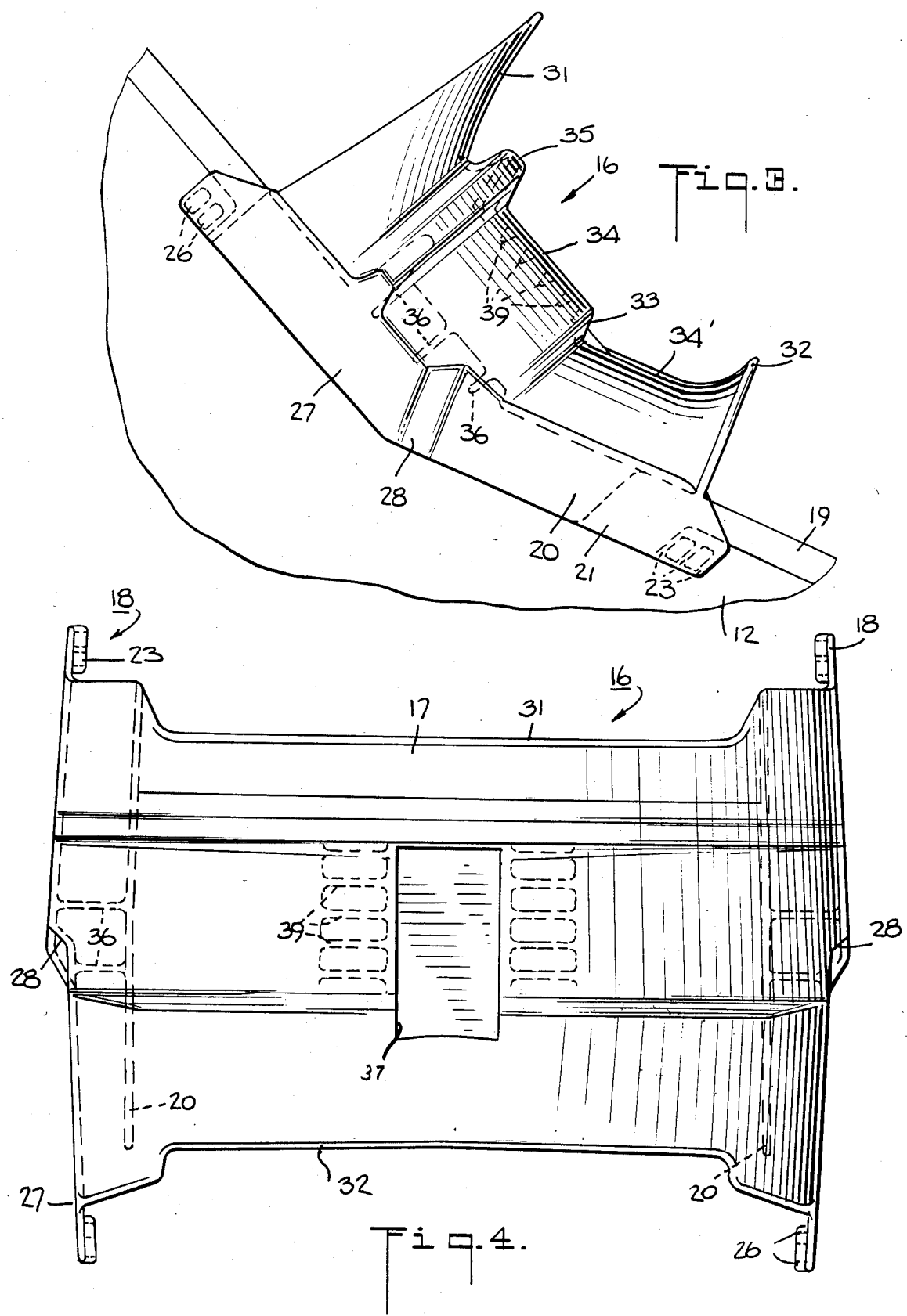

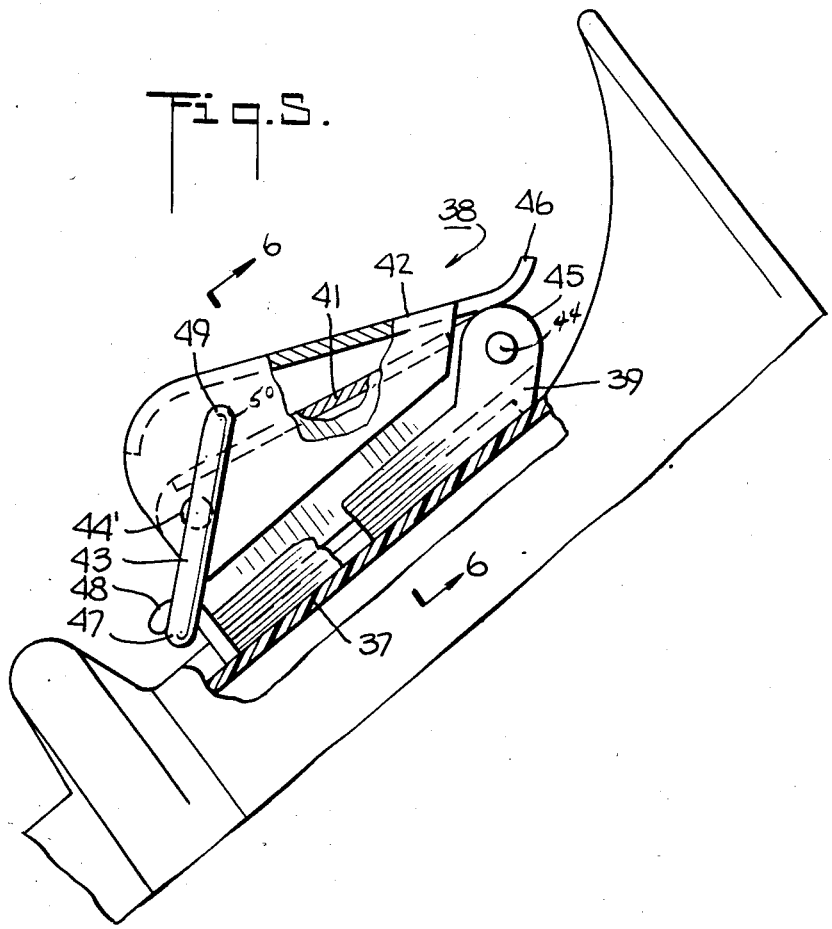
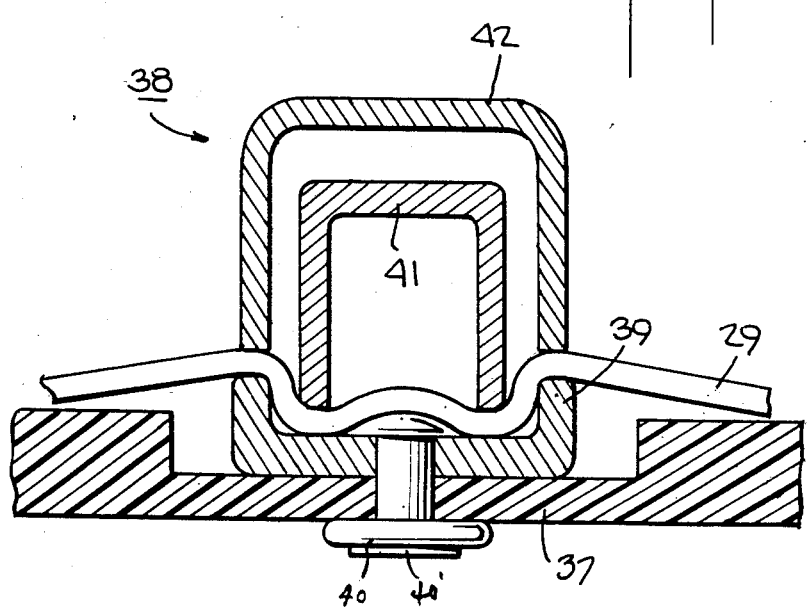

SAFETY SHIELD FOR USE IN A VEHICLE

This is a continuation of application Ser. No. 344,050 filed Mar. 22, 1973, now abandoned.

This invention relates to a safety shield for use in a vehicle. More particularly, this invention relates to a safety shield for use on a children's car seat.

Heretofore, various types of restraining means have been used in vehicles to prevent injury to the vehicle occupants should the vehicle be brought to a sudden stop or be involved in a collision. For example, it has been known to use various types of seat belts and shoulder straps to envelop the person of an occupant while seated to restrain forward movement. While such restraining belts have been found to be suitable in many instances for adults and older children, such have not been suitable for use for infants and small children. In order to take care of this, various types of infant seats and the like seating arrangements have been devised for infants and small children. In some instances, so called infant or car seats have been constructed for mounting on the seat of a vehicle and for cooperation with the restraining belts in the vehicle to restrain a child. However, where reliance is made solely on the use of the belts to restrain movement of the child, it has been found that such belts by themselves cannot protect sufficiently against certain types of impacts, such as high speed impacts and lateral collisions. For example, the child might be able to "submarine" out of the car seat where the seat envelops the child and the belt envelops the seat, or the seat and child might move laterally. Further, where the enveloping restaint is of rigid construction, there is a possibility of injury to a small child should the child be impelled against the rigid restraint during an impact without a sufficient cushioning effect.

In other instances, infants seats have been constructed to envelop or otherwise hook onto the vehicle seat. In these cases, the seats have usually been constructed with built-in restraining members which are pivoted or otherwise moved into place to restrain motion of an infant or small child. These restraining members, however, have usually been of a rigid type. As a result, should an impact occur, a small child can be impelled forwardly against the restraint during an accident to such a degree that the restraining member itself can cause injury to the child.

Accordingly, it is an object of the invention to provide a car seat with a non-rigid restraining means for use with small children and infants.

It is another object of the invention to provide a yielding restraint for retaining a small child or infant in a car seat.

It is another object of the invention to provide a restraint that distributes any impact load across a broad frontal area of a small child in a vehicle.

It is another object of the invention to preclude a car seat from moving laterally within a vehicle.

It is another object of the invention to preclude pivoting of a car seat in a vehicle.

It is another object of the invention to provide a safety shield for a car seat which is of simple construction.

It is another object of the invention to provide protection against a frontal, a lateral or a rear crash for an infant or small child sitting in a moving vehicle.

Briefly, the invention provides a safety shield for use in a vehicle which is adated to fit over a seat, such as a car seat, for an infant or small child. The safety shield itself is designed to be energy absorbing and constructed as a one piece body or shell of non-rigid energy-absorbing self-supporting material which includes means on each lateral side for engaging the car seat as well as a central portion which extends across the seat. In addition, the shield includes a face guard portion which extends outwardly from and over an upper edge of the central portion.

The safety shield is also provided with a gripping mens which is secured within the central shield portion for receiving and gripping a retaining belt, for example, a seat belt of an automobile.

Where the car seat inclues a pair of upstanding side walls, for example, as in the case of the infant seat described in U.S. Pat. No. 3,649,074, the means on the lateral sides of the shield for engaging the seat includes a pair of depending flanges which envelope the respective side walls of the seat and at least one protuberance on at least one flange projecting towards the other companion flange for engaging under or around a flange on the side wall of the seat so as to releasably lock the shield to the seat. Such protuberances are provided at the upper and lower ends of the lateral sides of the shield and are shaped so that the shield can be snap-fitted over the side walls of the seat. Alternatively, any other type of locking arrangement, snap-fit or otherwise, can be used to secure the shield to a car or infant seat.

The safety shield is designed to be energy absorbing. The central portion is contoured to have a rounded transverse cross-sectional shape to generally conform to the lateral contours of the occupant. The central portion is also contoured longitudinally to conform generally to the contour of the occupant and primarily to the waist and chest area of the occupant. The face guard which is provided projects outwardly away from the seat and occupant to afford added protection to the upper part of the occupant's person.

In combination with the energy-absorbing construction of the shield, the material of the shield is not rigid but is of non-rigid energy-absorbing material which is also self-supporting so as to flex under the impact of the seat occupant to absorb the momentum of the occupant should an accident occur, such as a collision or sudden stop. The flexing of the shield allows a controlled restraint to be imposed upon the person of the occupant as opposed to a rigid type of restraint which would instantly absorb the momentum of the occupant and, as such, possibly cause injury to the occupant. By yielding, the shield reduces the danger of injury to the occupant from the shield itself. Any suitable material can be used for this purpose. The shield can be made of any self-supporting material that is tough and has a high impact strength, yet is non-rigid and flexible under pressure and which will recover slowly when pressure is withdrawn. As an example of such material, use has been made of a synthetic thermoplastic polyolefin resin such as linear, i.e. high density, polyethylene. By being self-supporting, the shield can be easily handled and can be put in place without directly contacting the person of a child.

The gripping means can be permanently secured in place, for example, within a recess in the central portion of the shield and can be conveniently located to cooperate with a seat belt anchored in the vehicle. The gripping means includes a base, and a clamp for receiving and gripping the belt therebetween as well as a handle for opening and closing the gripping means. A lock ring, such as a wire lock ring is also incorporated in the gripping means for holding the handle closed. The provision of this gripping means serves to preclude lateral movement or pivoting of the car seat and safety shield during a lateral collision of the vehicle since the entire assembly is secured to the vehicle. In this way, the danger of injury due to lateral impacts can be substantially reduced.

The safety shield can be used in conjunction with a shoulder harness and safety belt of the car seat to further reduce the possibility of "submarining" or injury to a small child or infant sitting in the car seat. To this end, with the shoulder harness and safety belt secured in place over the occupant and with the safety shield secured to the car seat and the seat belt of the vehicle gripping about the safety shield, should an accident occur which would impel the occupant forwardly, the shoulder harness and safety belt would initially restrain the occupant to move forward gently into the safety shield. In this way, the occupant would not be thrown against the safety shield with the full impact of the collision. Thereafter, as the occupant is impacted against the safety shield, the shield will flex to absorb and dissipate the energy of the impacting occupant due to the combination of its energy-absorbing construction and energy-absorbing material. At some point, the shield will reach a limit of flexing at which time the occupant would be restrained against further forward movement. At this time, should the total impact energy not have been substantially dissipated to bring the occupant to a gentle halt, the vehicle seat belt would absorb the remaining momentum forces.

In order to further cushion the impact of an occupant, the safety shield can be provided with a layer of padding on the inside.

These and other objects and advantages of the invention will become more apparent from the following detailed description and appended claims taken in conjunction with the accompanying drawings in which:

FIG. 3 illustrates a side view of the safety shield of FIG. 1;

FIG. 4 illustrates a top front view of the safety shield of FIG. 1;

FIG. 5 illustrates a side view of the gripping means according to the invention on the safety shield; and FIG. 6 illustrates a cross-sectional view of the gripping means taken on line 6—6 of FIG. 5.

Figure 1:
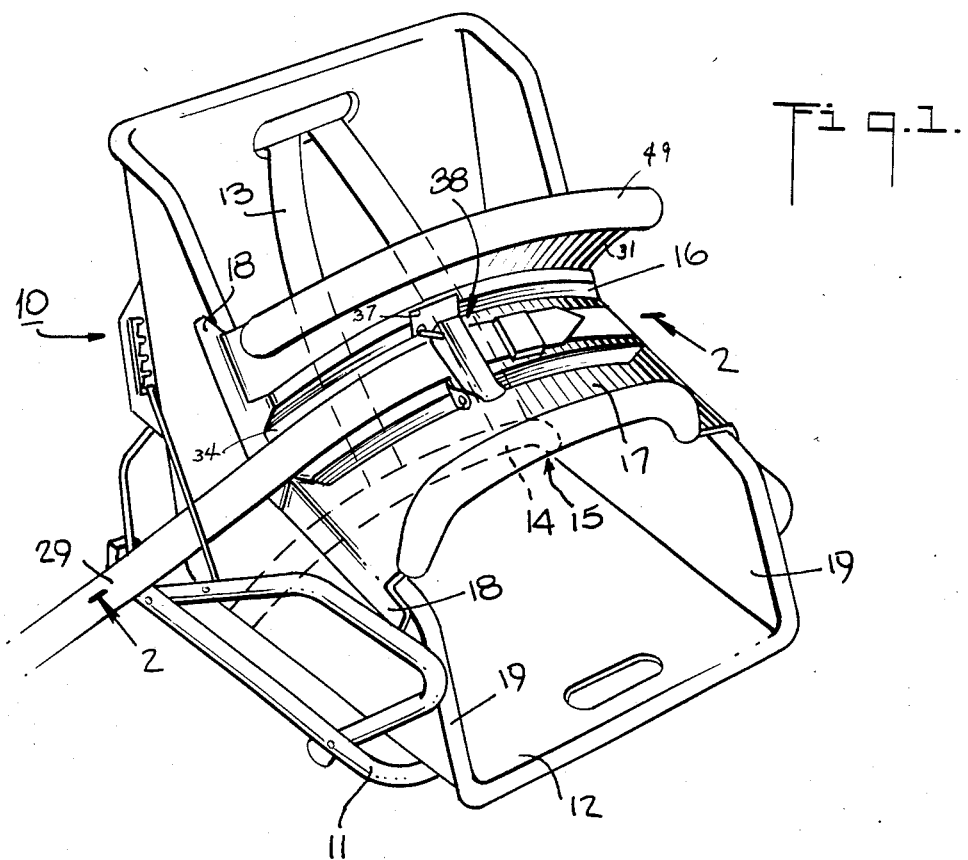
FIG. 1 illustrates a perspective view of a safety shield according to the invention in place on an infant seat.

Referring to FIG. 1, the car seat 10 is constructed with a frame 11 and a seat 12 which is pivotally mounted on the frame 11. The details of the car seat 10 are similar to that of the baby seat described in my earlier U.S. Pat. No. 3,649,074 and reference is made thereto. The car seat 10 is also provided with a seat harness 13 as also described in my earlier U.S. Pat. No. 3,649,074 as well as with a seat belt 14 which is intended to fit around the pelvic area of a small child or infant occupant of the seat. This belt 14 threads through suitable slots 15 in the bottom wall of the seat 12 and fastens with a quick-release buckle about the pelvic area of the occupant.

A safety shield 16 is mounted on the seat 12 to restrain forward and lateral movement of the occupant out of the seat 12. The shield 26 is constructed of non-rigid energy-absorbing self-supporting material and is of one-piece shell-like construction. The shield 16 includes a longitudinally extensive central portion 17 which extends across the seat as well as means 18 on each of the lateral sides of the shield 16 for engaging the sidewalls 19 of the seat 12.

Figure 2:
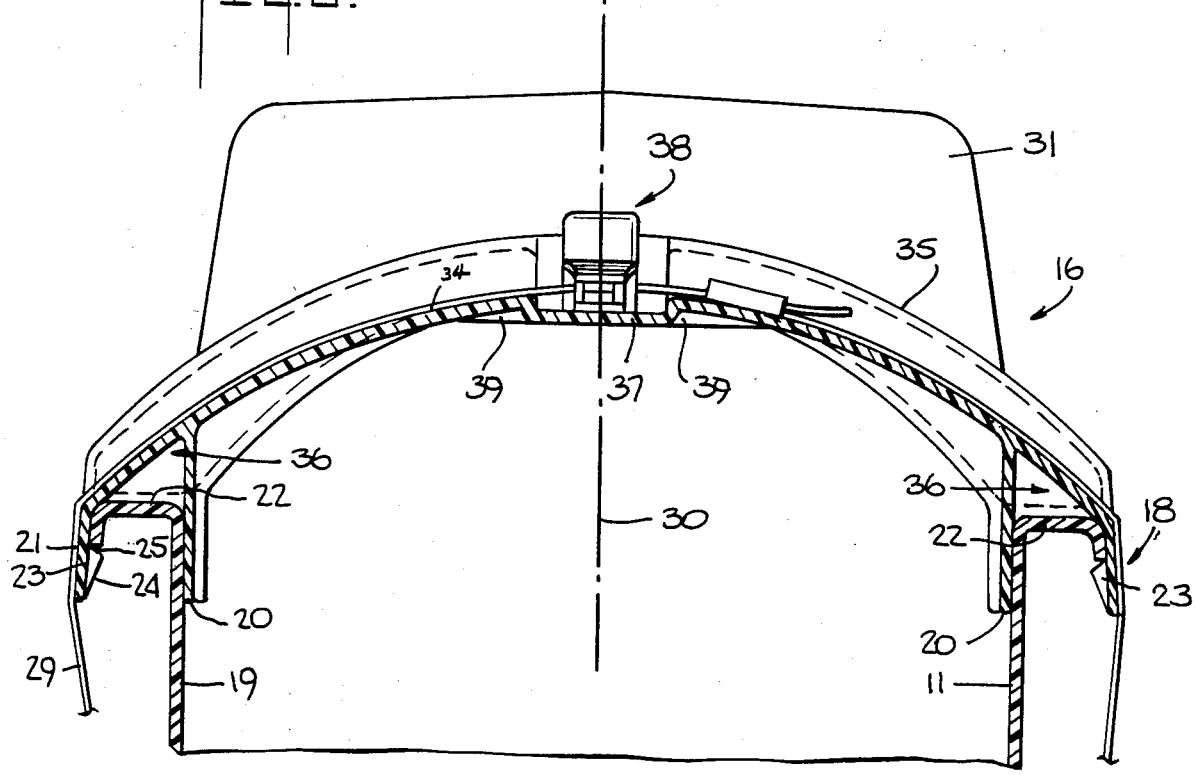
FIG. 2 illustrates a view taken along line 2—2 of FIG. 1.

Referring to FIG. 2, the means 18 for engaging the seat 12 includes a pair of flanges 20, 21 on each side of the shield 16 which depend downwardly over the side walls 19 of the seat 12 to define a channel. In addition, where the side walls 19 each have an outwardly extending L-shaped flange 22 on which the lateral sides of the shield 16 rest, the outermost flanges 21 of the shield have one or more protuberances 23 at each end which project inwardly to snap under the flanges 22 of the seat 12. As shown, each protuberance 23 is shaped with a cam surface 24 of inclined nature to facilitate passing of the protuberance 23 downwardly over the flange 22 of the seat 12. This allows the shield 16 to be snapped in place. The protuberances 23 also have a second cam surface 25 to facilitate removal of the shield 16 from the seat 12 with a slight force being required for removal of the shield 16. The second cam surface 25 is inclined more abruptly than the other cam surface 24 to require some force for removal of the shield 16.

As shown in FIG. 4, the protuberances 23 are provided at the upper and lower ends of each side of the shield 16 so that a four point securement of the shield 16 to the seat 12 is provided. As also shown, the outermost flanges 21 of the shield 16 project outwardly a greater distance than the innermost flanges 20. In this way, when the shield 16 is to be removed, the outer flanges 21 can be flexed in the region of the engaging means 18 to facilitate removal. In addition, the protuberances 23 at each end are formed in a block-like manner in spaced relation to each other to define finger receiving recesses 26 therebetween, for example, two recesses.

Referring to FIG. 3, the shield 16 is contoured so that the lateral sides 27 follow the contour of the sidewalls 19 of the baby seat 12. As shown, the sidewalls 19 are divided into two parts which are angularly inclined with respect to each other. In addition, where the side wall portions of the seat 12 are laterally offset at their juncture 28 with respect to each other, the outer flanges 21 are similarly contoured as more particularly shown in FIG. 4. The offsetting of the respective inclined portions of the shield 16 and seat 12 provide a ledge or shoulder against which a retaining belt 29 (see FIG. 1), such as a seat or lap belt of a vehicle, can bear in part.

As shown in FIG. 2, the central portion 17 of the shield 16 is contoured in a transverse cross section with a rounded shape i.e. a rounded convexly curved transverse cross-sectional shape. As shown, the central portions 17 extends between the pair of lateral sides 27. In addition, the thickness of the rounded portion 17 decreases from the middle plane of symmetry 30 or central axis in a direction outwardly towards the lateral sides, e.g. from 5/32 inch to ⅛ inch. The basic thickness of the shield 16 throughout is e.g. ⅛ inch except where thicker portions are formed as at joints, in flanges and as above noted.

As shown in FIG. 3, the upper edge of the central portion 17 of the shield 16 is provided with an integral face guard 31 which extends outwardly and over the central portion 17 in cantilevered fashion. The face guard 31 is constructed so as to flex yieldingly outwardly should a yound child-occupant impact against the guard during a frontal crash. The lower edge 32 of the central portion 17 is flared outwardly to allow space for a youngster to move his feet and legs, for example, in a kicking manner. Also, a shoulder 33 is formed between two smooth surface portions 34, 34' of the central portions 17.

As also shown in FIGS. 1 and 3, an integral upstanding rib 35 and the shoulder 33 are disposed across the central shield portion 17 to provide rigidity against forces directed inwardly towards the seat 12. In addition, the rounded contour of the central portion of the shield 16 is similar to that of an arch so that, structurally speaking, the shield 16 is able to resist to some degree impact forces imposed upon the shield 16 in a direction towards the seat 12. Also, as shown in FIGS. 2, 3 and 4, the interior of the shield 16 is provided with ribs 36, for example, three, within the confines of the lateral sides 27 to further rigidify the shield into a self-supporting unit.

Referring to FIGS. 1 and 2, the upper surface portion 34 of the central portion 17 of the shield 16 is provided with a recess 37, for example, a rectangular recess which is sized to receive a gripping means 38. The recess 37 is reinforced by a plurality of ribs 39, for example, five, on each side on the underside of the shield 16. The gripping means 38 is in the form of a gripper to receive and grip the seat belt 29 of the vehicle. The seat belt 29 is of conventional structure and a further description is not believed to be needed.

Referring to FIGS. 5 and 6, wherein the shield 16 is shown schematically for simplicity, the gripping means 38 is provided with a channel-shaped base 39 secured to the shield 16, a channel-shaped clamp 41 pivotally mounted on the base 39 to receive and grip the seat belt 29 therebetween, a handle 42 pivotally mounted on the clamp 41 for opening and closing the gripping means 38 and a lock ring 43 for holding the handle 42 in a closed position relative to the base 39 and clamp 41. As shown in FIG. 6, the base 39 is secured by a back-up plate 40 and two rivets 40' (only one shown) to the shield 16. The clamp 41 fits within the confines of the base 39 so that the seat belt 29 can be clamped between the base 39 and clamp 41 in a serpentine fashion with the belt 29 pinched between the base 39 and clamp 41. Similarly, the handle 42 is also of channel-shaped cross section to fit over the clamp 41 while being aligned with the base 39. The handle 42 can be spaced slightly from the belt 29 or can be sized to provide a further clamping action on the belt 29.

As shown in FIG. 5, the clamp 41 is pivotally mounted on the base 39 by means of a pivot pin 44 secured in two upstanding ears 45 on the base 39. In a similar fashion, the handle 42 is pivotally mounted to an opposite end of the clamp 41 via a pivot pin 44'. In addition, the handle 42 has a tongue portion 46 which extends outwardly to facilitate movement of the handle 42 relative to the base 39. The lock ring 43 is of generally U-shaped construction with an endless bar 47 disposed under an outwardly extending lip 48 of the base 39 while two projections 49 are formed at the opposite end to fit within suitable bores 50 in the side walls of the handle 42. The projections 49 are each inclined at a slight angle inwardly towards the bar 47 to exert a biasing force on the handle 42 when the handle 42 is closed. The relative positions of the pivot point of the handle 42 on the clamp 41, the lock ring 42 in the handle 42 and the lock ring 43 on the base 39 are such that when the gripping means 38 is in a closed position as shown in FIG. 5, the pivot point of the handle 42 on the clamp 41 is external to the plane of the lock ring 43. In this way, the force exerted by the lock ring 43 on the handle 42 tends to pivot the handle 42 in a clockwise position as viewed towards the base 39 and clamp 41.

In order to use the safety shield 16, a small child or infant is placed in the car seat 12. After the seat harness 13 and seat belt 14 have been applied about the person of the youngster, the safety shield 16 is put in place over the car seat 12 by snapping the flanges 21 of the shield 16 over the sidewalls 19 of the seat 12. Next, the gripping means 38 on the shield 12 is opened and the seat belt 29 is passed between the clamp 39 and base 41. The seat belt 29 is then locked in the usual fashion in a snug manner over the shield 16 and seat 12. Thereafter, the gripping means 38 is closed to securely clamp the baby seat 12 and shield 16 to the seat belt 29.

It is important to note that the safety shield can be put on a car seat whether the seat is one that is permanently upright or one that is adjustable to several upright and reclining positions.

When it is desired to remove an occupant from the car seat 12, a reverse procedure is carried out. That is, the car seat belt 29 is unbuckled and the gripper means 38 is opened to remove the belt 29. The safety shield 16 is then removed from the seat 12 by an outward bending of the respective flanges 21 to disengage the protuberances 23 and, after the seat belt 14 and harness 13 of the seat 12 are opened, the youngster can be removed.

As shown in FIG. 1, the shield 16 is provided with padding 49 which fits over the face guard 31 and extends downwardly along the inside of the shield 16 to terminate over the lower flared edge 32 of the shield. This padding 49 can be of any suitable construction and can be snapped in place.

Referring to FIG. 2, should the shield 16 flex outwardly, for example, should an occupant be impelled against the rounded central portion 17, the outermost flanges 21 of the shield tend to move inwardly towards each other. This action tends to further increase the interlocking relationship between the outermost flanges 21 of the shield 16 and the flanges 22 of the seat 12 so that a greater force is necessary in order to remove the shield 16 from the seat 12. However, when the shield 16 is to be removed, the flanges 21 need only be flexed at the ends where the locking protuberances 23 are located to remove first one side, then the other, of the shield 16 from the sidewalls 19 of the seat 12.

Referring to FIG. 1, should a vehicle carrying a car seat and shield, as above described, be involved in a lateral collision, the securement of the shield 16 and seat 12 to the seat belt 29 of the vehicle should act to prevent lateral movement of the seat 12 within the vehicle, presuming, of course, that the seat belt 29 is anchored to the floor of the vehicle. Likewise, pivoting of the seat 12 should be restrained due to the clamping of the gripping means 28 to the seat belt 29.

The invention thus provides a non-rigid safety shield for a car seat which is able to yield under the impact of an occupant to absorb the energy of the impact to some degree before precluding further forward motion of the occupant.

The invention further provides a car seat and safety shield combination which can be firmly fixed against lateral motion on a vehicle seat during lateral collisions.

The invention further provides a unique gripping means for fixedly securing the combination of the seat and safety shield to a conventional seat belt of a vehicle.

The invention further provides a safety shield of light weight construction which can be manufactured in relatively simple manner and which can be easily adapted to existing car seats. Because of the light weight construction of the safety shield, the shield can be easily transported from place to place when not in use. Furthermore, the shield can be utilized on the seat even when the seat is not used as a car seat.

What is claimed is:

1. The combination of a seat for a small child including a pair of upstanding side walls and a safety shield including a one-piece body having means on each lateral side engaging a respective side wall of said seat and a central portion extending across said seat, said portion having a continuous curvilinear cross-section with a decreasing thickness from the center line thereof towards each said lateral side.

2. The combination of a seat for a small child including a pair of upstanding side walls and a safety shield including a one-piece body having means on each lateral side engaging a respective side wall of said seat and a central portion having a rounded transverse cross-sectional shape extending across said seat in an arch-like manner and which further comprises a gripping means secured to said central portion for receiving and gripping a retaining belt to restrain lateral movement of said seat and shield.

3. The combination as set forth in claim 2 wherein said means on each lateral side includes a pair of depending flanges disposed over a respective side wall of said seat, and an outwardly extending flange on each said side wall, at least one of said flanges on said body on each lateral side of said seat including a protuberance engaging under said flange of said side wall to releaseably lock said shield to said seat.

4. A safety shield for use in a vehicle comprising a one-piece body including a central portion having a rounded transverse cross-sectional shape, a recess in a central plane of said central portion, a pair of depending flanges on each lateral side of said central portion for enveloping a portion of a seat and an integral face guard portion extending outwardly from and over an upper edge of said central portion in cantilevered fashion; and a gripping means secured to said body within said recess of said central portion for receiving and gripping a retaining belt.

5. A safety shield for use in a vehicle comprising a one-piece body including a central portion and means on each lateral side thereof for abutting a seat and a gripping means secured to said central portion for receiving and gripping a retaining belt therein, said gripping means including a base, a clamp pivotally mounted on said base to receive and grip a retaining belt therebetween, a handle pivotally mounted on said clamp to move said clamp relative to said base and a lock ring securing said handle to said base.

6. A safety shield as set forth in claim 5 wherein said base is secured to said central portion of said body.

7. A safety shield for use in a vehicle comprising a one-piece energy-absorbing body of non-rigid energy-absorbing material adapted to yield under the impact of an occupant to absorb the energy of the impact to some degree before precluding further forward motion of the occupant; said body including means on each lateral side thereof for engaging a seat, a central portion extending in an arch-like manner between said means for disposition across an engaged seat, said central portion having a rounded convexly curved transverse cross-sectional shape and being of a continuous curvilinear cross-section with a decreasing thickness from the center line thereof towards each said lateral side.

8. A safety shield for use in a vehicle comprising a one-piece energy-absorbing body of non-rigid energy-absorbing material adapted to yield under the impact of an occupant to absorb the energy of the impact to some degree before precluding further forward motion of the occupant; said body including means on each lateral side thereof for engaging a seat, a central portion extending in an arch-like manner between said means for disposition across an engaged seat, said central portion having a rounded convexly curved transverse cross-sectional shape, a face guard portion extending outwardly from and over an upper edge of said central portion, and a gripping means secured to said body within said central portion for receiving and gripping a retaining belt.

9. A safety shield for use in a vehicle comprising a one-piece body including depending flange means on each lateral side thereof for engaging a portion of a seat, a central portion having a rounded convexly curved transverse cross-sectional shape extending between said flange means, said body being made of non-rigid energy-absorbing material to yield under the impact of an occupant to absorb the energy of the impact to some degree before precluding further forward motion of the occupant, and a gripping means secured to said central portion for receiving and gripping a retaining belt therein in clamped frictional engagement.

* * * * *